Patented May 30, 1933

1,911,745

UNITED STATES PATENT OFFICE

STEPHEN P. BURKE, OF PLAINFIELD, NEW JERSEY, AND MADHAV R. BHAGWAT, OF BROOKLYN, NEW YORK, ASSIGNORS TO COMBUSTION UTILITIES CORPORATION, OF NEW YORK, N. Y., A CORPORATION OF MAINE

PROCESS OF MAKING SYNTHETIC RESINS

No Drawing.   Application filed December 13, 1928.   Serial No. 325,905.

The present invention relates to the art of making synthetic resins and is especially applicable to the production of resinous condensation products of the phenol formaldehyde type from tar acid containing distillates.

Among the principal objects of this invention are to provide an improved method for effecting the precipitation of resinous condensation products of the phenol formaldehyde type directly from either low temperature or high temperature tar, or from any of the distillates thereof; to provide an improved method of pretreating low temperature or high temperature tars or other distillates for removing or rendering innocuous those substances therein that reduce the reactivities of the materials taking part in the condensation reaction; and to provide an improved method of producing synthetic resins of uniform quality from either low temperature or high temperature coal tar and distillates thereof.

Methods for the formation of synthetic resins from alkali-soluble hydroxy cyclic substances by treatment thereof with compounds containing a mobile CHO group in the presence of alkaline catalysts are well known. The group of hydroxy cyclic substances especially suitable for such use belong to the aromatic group known broadly as tar acids, and more specifically as phenols, and the product resulting from heating these condensation products under suitable conditions is commonly known as Bakelite and has assumed a position of economic importance in our present industrial system.

Ordinarily the hydroxy cyclic compounds used for producing the resins are those that have been separated from tar distillates, as by chemical absorption and precipitation, or formed from benzene by the well known chemical process of making phenol, the said hydroxy cyclic compounds thus being segregated from the materials containing them in a natural state and being concentrated before their employment in the processes in use prior to our invention.

Attempts have been made heretofore to form resinous condensation products of the Bakelite type directly from tar distillate oils that have not been subjected to a previous refining treatment for the separation therefrom of the hydroxy cyclic compounds. Such attempts have not been entirely satisfactory for producing Bakelite type resins from tar acid containing oils in every case, and high boiling fractions of low temperature tar distillates having boiling ranges above 225° C. have been particularly difficult to treat to obtain the desired condensation product. The usual methods of making Bakelite type resins by formalin condensation of relatively pure or refined mixtures or fractions of phenolic compounds which are now commonly employed have involved the expense and difficulty of pretreating the tar in obtaining the same, as for example by fractional distillation, extraction with alkali, and separation and neutralization of the alkaline solution. However, it has generally been very difficult to determine in advance what would be the particular properties of the condensation product to be formed, and to secure "Bakelite A" type synthetic resins of uniform quality in successive batches.

The present invention is based upon the discovery that the substances present in the tar acid-containing distillates or fractions and which hinder the formation therefrom of condensation products of the Bakelite type, or cause the resins when formed to be of objectionable leathery texture are soluble in aqueous liquids such as water, dilute acids and dilute alkalis, so that the said substances may be removed from the tar distillates or rendered innocuous prior to the step of forming the resinous condensation product.

The formation of the desired type of synthetic resins of constant quality from tar distillates from either low temperature or high temperature tar may be further facilitated by maintaining a uniform, predetermined alkalinity in the liquid mixture employed for the condensation, which liquid comprises the tar acid containing distillate, an aqueous formalin solution and the alkaline catalyst solution.

It has now been determined that ammonia and ammonium salts have a profound influence in inhibiting or limiting the condensation reaction even when present in relatively small amounts, so that when such ammonium compounds are present in the tar oil, any resins formed often remain in solution in the neutral oil, and are not precipitated therefrom. Ammonium hydroxide when used as the sole alkaline catalyst will not precipitate resinous condensation products from formalin-treated tar distillates. Tar acid containing distillates normally contain small amounts of such ammonium compounds as well as nitrogen bases and the like, and these are removed in part at least by the aqueous wash liquid.

The following specific examples will serve to illustrate a certain preferred application of this invention, though it is clearly to be understood that they are in nowise to be construed as constituting limitations of the invention.

(a) A low temperature tar distillate having a boiling range up to 300° C. was washed in the cold, with about one-half its volume of 5% sulphuric acid, the mixture being agitated to secure intimate contact of the acid with the oil. The mixture was then permitted to stratify, the aqueous layer removed, and the washed oil was neutralized with a dilute alkaline solution such as a 2 to 4 percent aqueous solution of sodium carbonate, preferably agitating the mixture during the neutralization step. A dilute alkaline borate solution or like weak alkali may be substituted for the carbonate. This treatment does not produce an emulsion; and the washed oily distillate and the aqueous solution readily separate from each other upon standing. The said mixture was then allowed to stratify and the aqueous layer was removed. Fifteen parts of this pre-washed distillate was mixed with five parts of a 40% solution of formaldehyde and one part of normal sodium hydroxide solution, and the mixture then boiled for fifty minutes at a temperature of 97° to 98° C. The boiling was then stopped and the reaction mixture was permitted to separate into three layers, the resinous condensation product being in the bottom layer, an aqueous layer containing formaldehyde lying thereabove, while the residual oil or so-called neutral oil formed the top layer. The resinous product was then removed and dried under a vacuum for about four hours at 95° C., thereby yielding a phenol condensation product suitable for making molded materials or, since it is soluble in the usual organic solvents, it can be used in the varnish and related industries. The proportions of the reagents and conditions of the treatment may be varied from those given above. The acid treatment may, if desired, be effectively performed upon a heated tar distillate, although the preferred method is to carry out the said treatment in the cold.

Other dilute acids may be used in the place of sulphuric acid, as for example hydrochloric acid; and other strengths of acid may be used, such as a 10 per cent solution thereof.

(b) A sample of the same low temperature tar distillate recited in Example (a) is washed with water in three successive washings, in the ratio of 2000 parts of the distillate to 3000 parts of water, and the aqueous wash is then separated therefrom. The condensation of the prewashed distillate is then carried out in a manner similar to that recited in Example (a) above. Equal parts of distillate and of water may be employed, and the washing may be effected in one treatment over a period for example of about ten minutes at room temperature.

(c) *Condensation product from high temperature tar*

The sample of high temperature tar oil employed in this example possessed the following properties:

| | |
|---|---|
| Specific gravity at 25° C | 1.0135 |
| Boiling range | 99° C. to 268° C. (95% distilling off) |
| Tar acids | 26.2% |
| Tar bases | 5.2% |
| Sulphonation residue | 10% of the neutral oil |
| Tar acids: | |
| Specific gravity | 1.033 |
| Boiling range | 201° C. to 230° C. (95% distilling off) |

This oil was washed with half its volume of a 10% solution of sulphuric acid in the manner described in Example (a), the acid wash then being separated and the oil washed with warm water, after which the washed oil was neutralized with a 2% solution of sodium carbonate. (An examination of the acid water wash showed the presence of ammonium salts and pyridine bases therein). To 300 parts of this acid-treated distillate there were added 90 parts of formalin and 20 parts of a 4% solution of sodium hydroxide. The resultant mixture was then boiled for one half hour at 97° to 98° C. Boiling was then discontinued and the product allowed to settle and stratify, the resins forming the bottom stratum being drawn off and dried under vacuum for four hours at 95° C. The dry resins amounted to 23.3% by weight of the acid-treated oil employed in the condensation reaction, and were dark and clear.

Dilute aqueous solutions of alkaline reagents such as $Na_2CO_3$ are also affective in prewashing the tar acid containing distillates for the purpose recited.

The prewashing treatment greatly improves the color of the resins obtained, though the resins obtained from the distillate previously pretreated with water or alkalis are generally somewhat darker than those in which the acid-pretreatment has been employed.

It will be clear from the foregoing disclosure that the invention involves the production of synthetic resins of uniform quality directly from tar oils (including distillates) by first removing from the said tar oils or rendering innocuous the varying quantities of the condensation-inhibiting or retarding substances present therein. Applicant's process therefore makes possible the recovery of a uniform high grade condensation product of light color directly from either high or low temperature tar distillates obtained from any source, without the necessity for previously subjecting the said oils to an alkali extraction treatment or the like for segregation of the tar acids, thereby effecting substantial economies in the manufacture of these condensation products from a comparatively new and rapidly increasing source of raw material. The invention is not limited to distillates of the boiling point ranges specifically disclosed, but covers the entire range of tar acid-containing distillates of whatever boiling point range. The tar acid containing distillates are not limited to those tars obtained from the treatment of coal and the like. Tars derived from petroleum and from the distillation of wood, especially wood tar obtained at high temperatures, may be used. The invention is susceptible of modification within the scope of the appended claims.

We claim:

1. In the process of preparing a moldable synthetic resin of the phenol formaldehyde type from a tar acid-containing distillate, the step of removing ammonium compounds from the said distillate prior to the treatment with formaldehyde and a basic catalyst for the production of the said moldable synthetic resin.

2. In the process of preparing moldable synthetic resins of the phenol formaldehyde type from tar acid-containing distillates, the step of pre-washing the said distillates in the cold with water for removing water soluble deleterious substances dissolved therein, then separating the aqueous solution of said substances from the distillate, and heating the latter with formaldehyde and a solution of a basic catalyst, thereby producing the said moldable synthetic resin.

3. The process as defined in claim 2 in which the said water contains therein a dissolved substance adapted to maintain in the resultant solution an unbalanced condition between the free hydrogen and free hydroxyl ions therein.

4. In the process of preparing moldable synthetic resins of the phenol formaldehyde type from tar acid-containing distillates, the steps which include prewashing the said distillates with a dilute acid aqueous solution, removing the said solution from the distillate, neutralizing the acidity of the distillate with an alkaline solution following the acid treatment, separating the distillate from the said solution, and heating the former with formaldehyde and a basic catalyst thereby producing the said moldable synthetic resin.

5. In the process of preparing moldable synthetic resins of the phenol formaldehyde type from tar acid-containing distillates, the step which comprises prewashing such distillates with an aqueous solution adapted to dissolve water soluble substances present in the distillate, but not adapted to form an emulsion with the tar acid constituents of the said distillate, thereby removing from the distillate ammonium salts and other water-soluble substances, thereafter separating from the distillate the aqueous liquid and substances dissolved therein, and heating the purified distillate with formaldehyde in the presence of a basic catalyst, thereby producing the said moldable synthetic resin.

6. The process as defined in claim 5 in which the tar acid-containing distillate employed has a boiling range with an upper limit above 225° C.

7. The process of preparing moldable bakelite type synthetic resins from tar acid-containing distillates which comprises the steps of pretreating the said distillates with a dilute aqueous solution of a weak alkali in amounts sufficient to dissolve out water-soluble compounds present in the distillates, separating the distillates and aqueous solution and treating the former with sufficient of a solution of an alkaline catalyst to at least render the distillate alkaline, adding thereto a substance having a mobile CHO group, and heating the mixture to form synthetic resins.

8. The process of preparing moldable bakelite type synthetic resins from tar acid-containing distillates which comprises the steps of prewashing the said distillates with a dilute aqueous solution capable of and in amounts sufficient to dissolve out water-soluble compounds present in the distillates, separating the distillates from the aqueous solution and treating the former with a caustic soda and formaldehyde in the proportions by weight of 15 parts of distillate, 5 parts of a 40% formaldehyde solution, and one part of normal sodium hydroxide solution, and heating the mixture to form synthetic resins.

9. The process as defined in claim 5 in which the aqueous prewashing solution employed has an acid reaction.

In testimony whereof I affix my signature.
MADHAV R. BHAGWAT.
In testimony whereof I affix my signature.
STEPHEN P. BURKE.